(12) United States Patent
Hamilton et al.

(10) Patent No.: US 9,084,072 B2
(45) Date of Patent: Jul. 14, 2015

(54) TECHNIQUES FOR USING SOFTWARE APPLICATION-RELATED METADATA IN NEAR FIELD COMMUNICATION TRANSMISSIONS

(71) Applicant: Google Inc., Mountain View, CA (US)

(72) Inventors: Robert William Hamilton, Santa Clara, CA (US); Martijn Franciscus Agnes Coenen, Santa Clara, CA (US); Rachel Leah Garb, Mountain View, CA (US); Jeffrey William Hamilton, Austin, TX (US); Nicholas Julian Pelly, San Francisco, CA (US)

(73) Assignee: Google Inc., Mountain View, CA (US)

( * ) Notice: Subject to any disclaimer, the term of this patent is extended or adjusted under 35 U.S.C. 154(b) by 218 days.

(21) Appl. No.: 13/648,371

(22) Filed: Oct. 10, 2012

(65) Prior Publication Data

US 2013/0095756 A1 Apr. 18, 2013

Related U.S. Application Data

(60) Provisional application No. 61/548,090, filed on Oct. 17, 2011, provisional application No. 61/548,094, filed on Oct. 17, 2011.

(51) Int. Cl.
*H04B 7/00* (2006.01)
*H04W 4/00* (2009.01)
(Continued)

(52) U.S. Cl.
CPC ............. *H04W 4/001* (2013.01); *H04L 67/02* (2013.01); *H04L 67/06* (2013.01); *H04L 67/34* (2013.01); *H04W 4/008* (2013.01); *H04W 4/023* (2013.01)

(58) Field of Classification Search
CPC ... H04W 8/245; H04W 76/02; H04M 1/7253; H04M 1/6066; H04M 2215/32; H04M 2250/02; H04M 1/72566; H04L 67/303; H04L 2209/80; H04L 67/06; G06F 8/665; H04B 15/00; H04B 5/0031
USPC ................................ 455/418–420, 41.1–41.2
See application file for complete search history.

(56) References Cited

U.S. PATENT DOCUMENTS 8,335,472 B2 * 12/2012 Miyata .......................... 455/41.2
8,452,347 B2 * 5/2013 Rahman et al. ............. 455/569.1

(Continued)

FOREIGN PATENT DOCUMENTS

GB 2430119 A 3/2007
WO 2007068993 A 6/2007

(Continued)

OTHER PUBLICATIONS

International Search Report and Written Opinion for International Application No. PCT/US2012/059659 dated Feb. 27, 2013 (13 pages).

(Continued)

*Primary Examiner* — Edward Urban
*Assistant Examiner* — Max Mathew
(74) *Attorney, Agent, or Firm* — Remarck Law Group PLC (57) ABSTRACT

A computer-implemented method includes determining, at a first mobile device associated with a first user, whether a second mobile device is within range for near field communication (NFC). When in range, the method includes receiving, at the first mobile device, first data and second data from the second mobile device via an NFC transmission, the first data being based on input from a second user associated with the second mobile device, the second data being metadata indicating a software application configured to process the first data. When the first mobile device does not have the software application indicated by the second data, the method includes retrieving, at the first mobile device, the software application via a network. The method also includes providing, at the first mobile device, the first data to the first user via the software application.

23 Claims, 6 Drawing Sheets

(51) Int. Cl.
  *H04W 4/02* (2009.01)
  *H04L 29/08* (2006.01)

(56) References Cited

U.S. PATENT DOCUMENTS

| | | | |
|---|---|---|---|
| 8,509,744 B2* | 8/2013 | Brennan et al. | 455/412.2 |
| 2004/0038692 A1* | 2/2004 | Muzaffar | 455/502 |
| 2004/0137892 A1* | 7/2004 | Hanood | 455/418 |
| 2006/0010435 A1* | 1/2006 | Jhanwar et al. | 717/168 |
| 2008/0079573 A1* | 4/2008 | Bloebaum et al. | 340/568.1 |
| 2010/0227601 A1* | 9/2010 | Walton et al. | 455/418 |
| 2010/0257239 A1* | 10/2010 | Roberts | 709/204 |
| 2011/0177802 A1* | 7/2011 | Gupta | 455/418 |

FOREIGN PATENT DOCUMENTS

| | | |
|---|---|---|
| WO | 2010077194 A | 7/2010 |
| WO | 2011020796 A | 2/2011 |

OTHER PUBLICATIONS

NFC Forum TM: NFC Record Type Definition (RTD) Technical Specification, NFC Forum, vol. RTD 1.0, Jul. 24, 2006, 20 pages.

\* cited by examiner

TECHNIQUES FOR USING SOFTWARE APPLICATION-RELATED METADATA IN NEAR FIELD COMMUNICATION TRANSMISSIONS

CROSS-REFERENCE TO RELATED APPLICATIONS

This application claims the benefit of U.S. Provisional Application No. 61/548,090, filed on Oct. 17, 2011, and of U.S. Provisional Application No. 61/548,094, filed on Oct. 17, 2011, each of which is incorporated herein by reference in its entirety.

FIELD

The present disclosure relates to mobile devices and, more particularly, to techniques for using software application-related metadata in near field communication (NFC) transmissions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A "user device" refers to a computing device that typically includes a user interface, a display, and a processor. User devices may include mobile devices such as laptop computers, tablet computers, and mobile phones. Mobile devices may selectively communicate via one or more networks such as a mobile telephone network, the Internet, and the like. Additionally or alternatively, mobile devices may selectively communicate with other mobile devices. One technique for communication between two or more mobile devices is near field communication (NFC). Specifically, NFC may be used to transfer various forms of data between two or more mobile devices arranged in close proximity. For example, this data may include data such as audio, video, photos, and the like.

SUMMARY

A computer-implemented method for near field communication (NFC) between a first mobile device and a second mobile device is presented. The method includes determining, at the first mobile device, whether the second mobile device is within range for NFC, the range for NFC being based on whether the second mobile device is within a predetermined distance from the first mobile device, the predetermined distance corresponding to a maximum distance for reliable NFC transmissions, the first mobile device being associated with a first user. When the second mobile device is within range for NFC with the first mobile device, the method includes receiving, at the first mobile device, first data and second data from the second mobile device via an NFC transmission, the first data being based on input from a second user associated with the second mobile device, the second data being metadata indicating a software application configured to process the first data. The method includes determining, at the first mobile device, whether the first mobile device has the software application indicated by the second data, the software application being configured to provide the first data to the first user. When the first mobile device has the software application indicated by the second data, the method includes selecting, at the first mobile device, the software application indicated by the second data from one or more applications stored in a memory of the first mobile device, each of the one or more applications also being configured to process the first data. When the first mobile device does not have the software application indicated by the second data, the method includes providing, via a display of the first mobile device, a request to the first user to allow the first mobile device to download the software application via a network. The method includes receiving, via a user interface of the first mobile device, input from the first user, the input including a response to the request, the response indicating whether the first mobile device can download the software application via the network. The method includes selectively retrieving, at the first mobile device, the software application from the network based on the input from the first user. The method also includes selectively providing, at the first mobile device, the first data to the first user via the software application.

Another computer-implemented method is also presented. The method includes determining, at a first mobile device associated with a first user, whether a second mobile device is within range for near field communication (NFC) with the first mobile device. When the second mobile device is within range for NFC with the first mobile device, the method includes receiving, at the first mobile device, first data and second data from the second mobile device via an NFC transmission, the first data being based on input from a second user associated with the second mobile device, the second data being metadata indicating a software application associated with the first data, wherein the software application is configured to process the first data. The method includes determining, at the first mobile device, whether the first mobile device has the software application indicated by the second data. When the first mobile device does not have the software application indicated by the second data, the method includes retrieving, at the first mobile device, the software application via a network. The method also includes providing, at the first mobile device, the first data to the first user via the software application.

In some embodiments, retrieving the software application via the network further includes providing, via a display of the first mobile device, a request to the first user to allow the first mobile device to download the software application via the network.

In other embodiments, retrieving the software application via the network further includes receiving, via a user interface of the first mobile device, input from the first user, the input including a response to the request, the response indicating whether the user has granted permission to the first mobile device to download the software application via the network.

In some embodiments, retrieving the software application via the network further includes selectively retrieving the software application via the network based on the input from the first user.

In other embodiments, the second mobile device generates a packet including both the first data and the second data.

In some embodiments, the second data includes a unique identifier indicating one of a first plurality of software applications associated with mobile devices.

In other embodiments, determining whether the first mobile device has the software application further includes searching a memory of the first mobile device.

In some embodiments, retrieving the software application via the network further includes downloading the software application via the network and storing the software application in the memory.

In other embodiments, the method further includes when the first mobile device is determined to have the software application indicated by the second data, selecting, at the mobile device, the software application indicated by the second data from one or more applications stored in the memory of the first mobile device, each of the one or more applications also being associated with the first data.

In some embodiments, the memory is configured to store a second plurality of software applications, wherein at least one of the second plurality of software applications is not associated with the first data.

In other embodiments, the second plurality of software applications is less than or equal to the first plurality of software applications.

In some embodiments, determining whether the second mobile device is in range for NFC with the first mobile device further includes generating, at the first mobile device, an electromagnetic field using radio frequency (RF) waves, and wherein determining whether the second mobile device is in range for NFC with the first mobile device is based on a response from the second mobile device to the electromagnetic field.

A system is also presented. The system includes a near field communication (NFC) module, an application determination module, an application retrieval module, and an application control module. The NFC module determines, at a first mobile device associated with a first user, whether a second mobile device is within range for NFC with the first mobile device. When the second mobile device is within range for NFC with the first mobile device, the NFC module receives, at the first mobile device, first data and second data from the second mobile device via an NFC transmission, the first data being based on input from a second user associated with the second mobile device, the second data being metadata indicating a software application associated with the first data. The application determination module determines, at the first mobile device, whether the first mobile device has the software application indicated by the second data. The application retrieval module retrieves, at the first mobile device, the software application via a network when the first mobile device does not have the software application indicated by the second data. The application control module provides, at the first mobile device, the first data to the first user via the software application.

In some embodiments, the application retrieval module provides, via a display of the first mobile device, a request to the first user to allow the first mobile device to download the software application via the network.

In other embodiments, the application retrieval module receives, via a user interface of the first mobile device, input from the first user, the input including a response to the request, the response indicating whether the user has granted permission to the first mobile device to download the software application via the network.

In some embodiments, the application retrieval module selectively retrieves the software application via the network based on the input from the first user.

In other embodiments, the second mobile device generates a packet including both the first data and the second data.

In some embodiments, the second data includes a unique identifier indicating one of a first plurality of software applications associated with mobile devices.

In other embodiments, the application determination module determines whether the first mobile device has the software application by searching a memory of the first mobile device.

In some embodiments, the application retrieval module retrieves the software application via the network by downloading the software application via the network and storing the software application in the memory.

In other embodiments, when the application determination module determines that the first mobile device is determined to have the software application indicated by the second data, the application determination module selects the software application indicated by the second data from one or more applications stored in the memory of the first mobile device, each of the one or more applications also being associated with the first data.

In some embodiments, the memory is configured to store a second plurality of software applications, wherein at least one of the second plurality of software applications is not associated with the first data.

In other embodiments, the second plurality of software applications is less than or equal to the first plurality of software applications.

In some embodiments, the NFC module determines whether the second mobile device is in range for NFC with the first mobile device by generating an electromagnetic field using radio frequency (RF) waves, and the NFC module determines whether the second mobile device is in range for NFC with the first mobile device based on a response from the second mobile device to the electromagnetic field.

Another computer-implemented method is also presented. The method includes receiving, by a first device and using a near field communication (NFC) connection established between the first device and a second device, 1) a digital item, and 2) an indication of a first application capable of processing the digital item at the first device. If the first device does not have the first application, then the method includes obtaining, by the first device, the first application or a second application that is capable of processing the digital item at the first device. The method also includes processing, by the first device, the digital item using the first application or the second application.

In some embodiments, obtaining by the first device of the first application or the second application is performed automatically upon receiving, by the first device, the digital item and the indication of the first application capable of processing the digital item at the first device.

In other embodiments, the method further includes requesting approval of a user of the first device to obtain, by the first device, the first application or the second application, and selectively obtaining, by the first device, the first application or the second application based on the approval of the user.

In some embodiments, obtaining by the first device of the first application or the second application is performed via a higher-bandwidth, non-NFC connection.

In other embodiments, when the first device has a first plurality of applications capable of processing the digital item, the method includes selecting the first application or the second application specified by the indication from the first plurality of applications stored in a memory of the first device, wherein the indication includes a unique identifier or a unique code indicating one of second plurality of software applications associated with mobile devices, the second plurality of applications being greater than or equal to the first plurality of applications.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
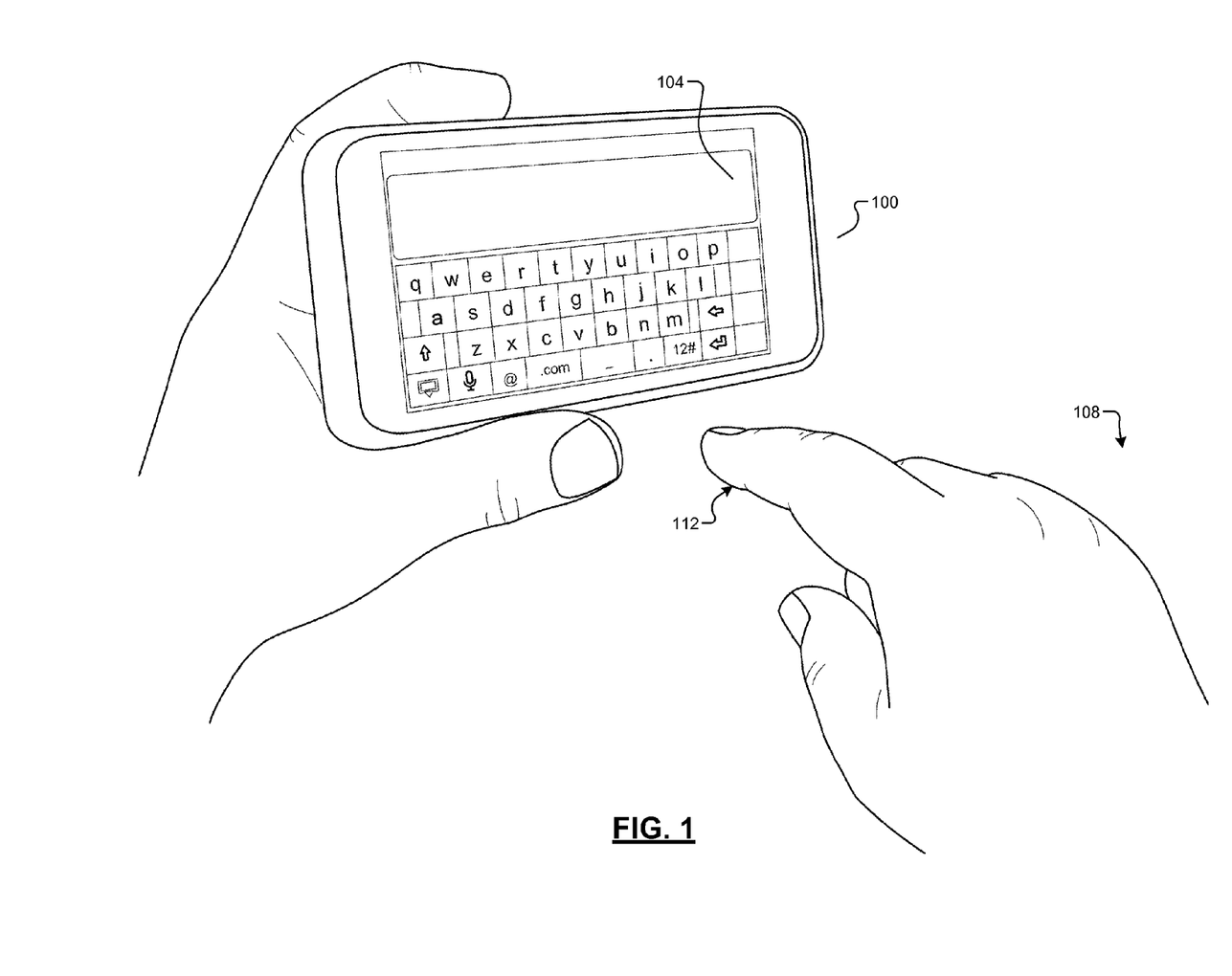
FIG. 1 is a schematic illustration of a user interacting with a mobile device according to some implementations of the present disclosure.

Referring now to FIG. 1, a schematic illustration of interaction between a user 108 and a mobile device 100 is shown. As previously described, the mobile device 100 may be a mobile phone, a tablet computer, or the like. The mobile device 100 generally includes a display 104, for example, a touch display as shown. The mobile device 100 may additionally or alternatively include a physical character layout, e.g., a partial QWERTY-based keyboard. The touch display 104 may display information to and receive input from a user 108. For example, the user 108 may input information to the mobile device 100 via the touch display 104 using one or more fingers 112.

Figure 2:
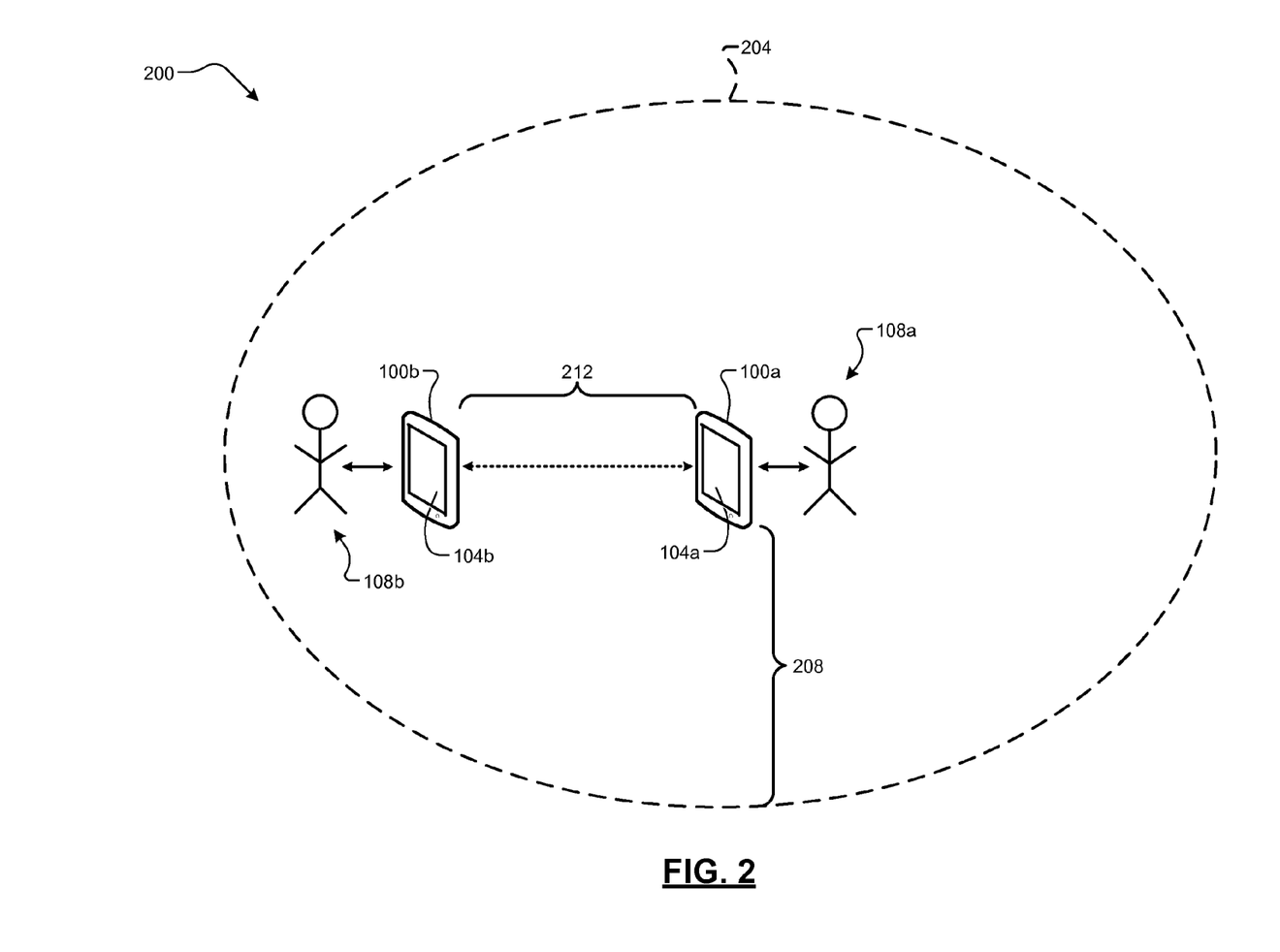
FIG. 2 is a schematic illustration of two mobile devices interacting via near field communication (NFC) according to some implementations of the present disclosure.

Referring now to FIG. 2, a schematic illustration of a near field communication (NFC) system 200 is shown. The NFC system 200 generally includes a first mobile device 100a and a second mobile device 100b, which are operated and transported by a first user 108a and a second user 108b, respectively. While two mobile devices are shown, one of the mobile devices may be a non-portable or stationary user device. One of the two devices, however, is typically a mobile device because one device has to be brought into range for NFC with the other device. The first mobile device 100a and the second mobile device 100b may also have a first touch display 104a and a second touch display 104b, respectively.

In order to establish NFC between the first mobile device 100a and the second mobile device 100b, the first mobile device 100a (the "initiator") initiates communication with a second mobile device 100b (the "target"). Specifically, the first mobile device 100a may generate an electromagnetic field 204 using radio frequency (RF) waves. For example, the RF waves may have a frequency of approximately 13.56 megahertz (MHz) within a bandwidth of approximately 14 kilohertz (kHz). Other frequency ranges, however, may also be used.

The electromagnetic field 204 extends outwardly from the first mobile device 100a for a first distance 208. The electromagnetic field 204, therefore, may cover an area defined by the first distance 208. For example, the first distance 208 to achieve a successful NFC transmission may be approximately 20 centimeters (cm). NFC transmissions at the first distance 208, however, may be inconsistent and therefore may suffer from data loss. Therefore, a second distance 212 may be desired for more effective NFC transmission, the second distance 212 being shorter than the first distance 208. For example, the second distance 212 may be approximately 4 cm.

When the second mobile device 100b is brought within the electromagnetic field 204, e.g., by the second user 108b, the second mobile device 100b may behave according to one of two operating modes. In a passive operating mode, the second mobile device 100b modulates a load to communicate back to the first mobile device 100a. In an active mode, on the other hand, the second mobile device 100b alternates with the first mobile device 100a in generating the electromagnetic field 204. In other words, during the active mode only one of the first mobile device 100a and the second mobile device 100b is generating the electromagnetic field 204 at a given time while the other mobile device waits for data.

As previously described, NFC may be used to transfer a variety of data between mobile devices (audio, video, photos, etc.). Each of the various types of data may have one or more software applications associated with it. For example, a picture viewing software application may be associated with photo data. Additionally, for example, a music player software application may be associated with audio data.

The mobile device may not know which software application to use to open the received data. For example, the mobile device may have a plurality of different software applications that are each capable of opening the received data (a first plurality of applications). In this case, the mobile device may open the received data using an incorrect or undesirable software application. Further, in some cases the mobile device may not have even one software application capable of opening the received data. In this case, the user associated with the mobile device may be unable to open the received data.

Accordingly, techniques are presented for using software application-related metadata in NFC transmissions. The techniques generally provide for faster opening and/or fewer errors in opening of data received at a mobile device via NFC transmission. The techniques include determining, at a first mobile device associated with a first user, whether a second mobile device is in range for NFC. For example, the second mobile device may be in range for NFC when the second mobile device is within a predetermined distance from the first mobile device, e.g., 4 cm.

When the second mobile device is in range for NFC, the techniques include receiving, at the first mobile device, first data (a "digital item") and second data (an "indication") from the second mobile device via an NFC transmission. The first data can be based on input from a second user to the second mobile device. The second data can be metadata indicating a software application associated with the first data. A software application may be associated with the first data when the software application is capable of opening, e.g., processing, the first data. For example, the software application may be associated with one or more file extensions, e.g., .JPEG or .PNG image files.

The techniques also include determining, at the first mobile device, whether the first mobile device has the software application. For example, the software application may be stored in memory at the first mobile device. The memory may store a plurality of different software applications capable of opening the data (the first plurality of software applications). In addition, the memory may store other data, e.g., other software applications, which are unrelated to the data. In other words, the memory may store more than the first plurality of software applications (a second plurality of software applications). For example, the techniques can perform a search of the memory to attempt to locate the specified software application.

The techniques, therefore, can select the software application specified by the first data. When the first mobile device has the software application, the techniques include providing, via the first mobile device, the first data to the first user via the software application. When the first mobile device does not have the software application, the techniques include retrieving, at the first mobile device, the software application from a network, e.g., the Internet. The techniques may also include prompting the first user, at the first mobile device, as to whether to retrieve, e.g., download, the software application from the network, and then proceeding based on the first user's response.

In some implementations, the techniques include determining, at a first mobile device associated with a first user, whether the first mobile device is in range for NFC with a second mobile device. When the first mobile device is in range for NFC, the techniques include generating, at the first mobile device, first data based on input from the first user. The techniques also include generating, at the first mobile device, second data (the metadata) based on the first data, the second data being metadata indicating a software application associated with the first data. The techniques then include transmitting, from the first mobile device, the first data and the second data to the second mobile device via NFC transmission.

The second mobile device may then use the second data to determine whether the second mobile device has the software application associated with the first data. When the second mobile device has the software application, the second mobile device may open the first data using the software application. When the second mobile device does not have the software application, the second mobile device may retrieve the software application via a network, e.g., the Internet, and then open the first data using the retrieved software application. For example, a second user of the second mobile device may be prompted before retrieving, e.g., downloading, the software application from the network, and the techniques may then proceed based on the second user's response.

Figure 3:
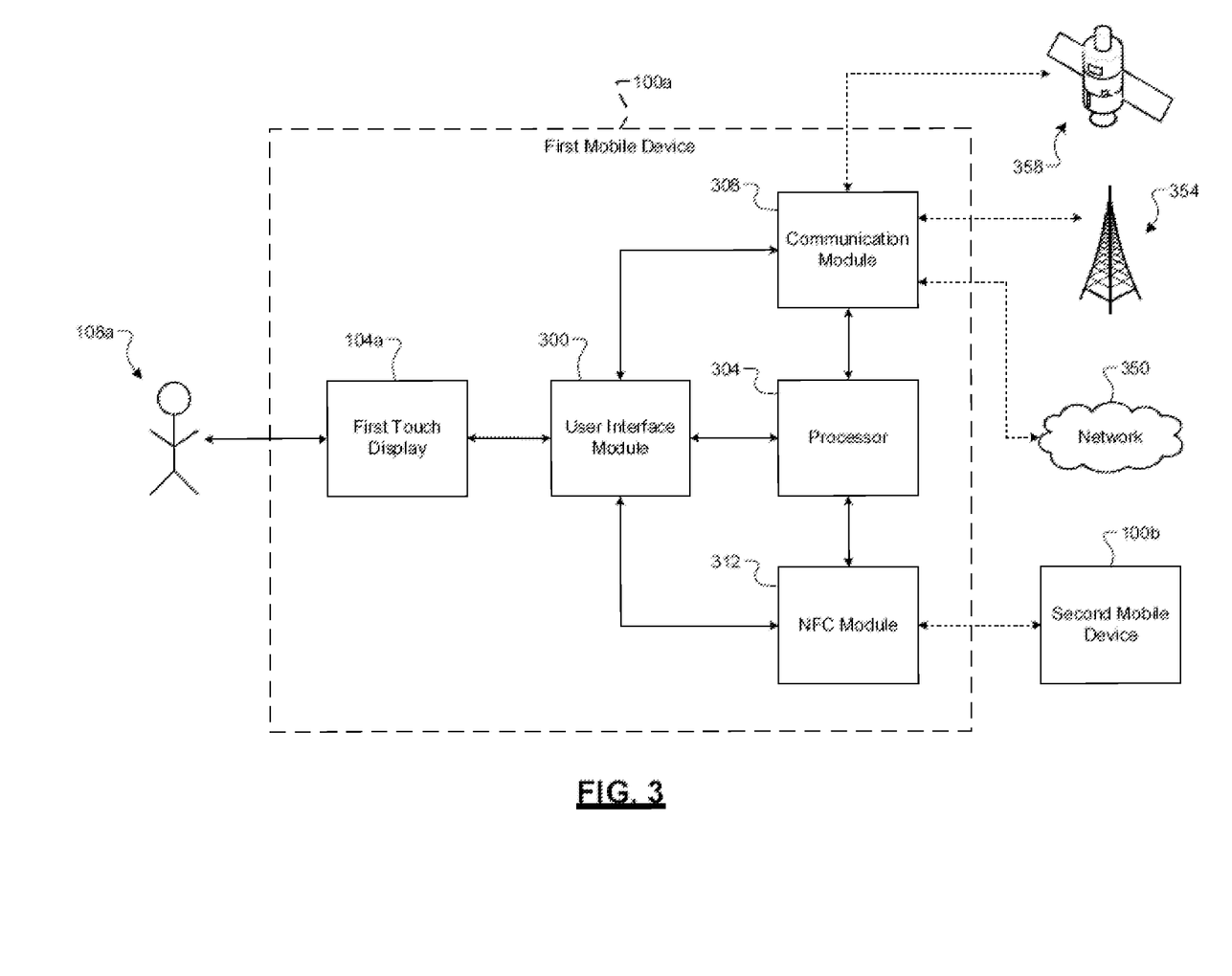
FIG. 3 is a functional block diagram of one of the mobile devices of FIG. 2 according to some implementations of the present disclosure.

Referring now to FIG. 3, an example of the first mobile device 100a is shown in more detail. The first mobile device 100a may include the first touch display 104a, a user interface module 300, a processor 304, a communication module 308, and an NFC module 312. While these five components are shown and described herein, the first mobile device 100a may also include other suitable computing components, such as memory. Furthermore, while an example of the first mobile device 100a is shown, the second mobile device 100b may also have the same or similar components as the first mobile device 100a.

The first user 108a can communicate with the first mobile device 100a via the first touch display 104a. In particular, the first touch display 104a may display information to and receive input from the first user 108a. The user interface module 300 controls the first touch display 104a. Specifically, the user interface module 300 may generate or manipulate the information to be displayed to the first user 108a via the first touch display 104a. The user interface module 300 may also interpret the input received from the first user 108a via the first touch display 104a. The user interface module 300 may receive information from and communicate information to each of the processor 304, the communication module 308, and the NFC module 312.

The processor 304 may control most operations of the first mobile device 100a. The processor 304, therefore, may communicate with each of the user interface module 300, the communication module 308, and the NFC module 312. For example, the processor 304 may perform tasks such as, but not limited to, loading/controlling an operating system of the first mobile device 100a, loading/configuring communication parameters for the communication module 308 and/or the NFC module 312, controlling IME parameters of the user interface module 300, loading/controlling software applications, and controlling memory storage/retrieval operations, e.g., for loading of the various parameters.

The communication module 308 controls communication between the first mobile device 100a and other devices. For example only, the communication module 308 may provide for communication between the first mobile device 100a and other users associated with the first user 108a and/or the Internet. The communication module 308 may enable the first mobile device 100a to communicate via one or more of three communication mediums: a computing network 350 (hereinafter "the network 350"), e.g., the Internet, a mobile telephone network 354, and a satellite network 358. Other communication mediums may also be implemented, e.g., NFC (see below).

The NFC module 312 may control NFC between the first mobile device 100a and other devices, such as the second mobile device 100b. While the NFC module 312 is shown as a separate component, the NFC module 312 may also be incorporated into the communication module 308. The NFC module 312 may determine whether another device, e.g., the second mobile device 100b, is in range for NFC transmission. For example, as previously described, another device may be in range for NFC transmission when it is within a predetermined distance, e.g., 4 cm, from the first mobile device 100a. The first mobile device 100a may then transmit information to or receive information from another device, e.g., the second mobile device 100b.

Figure 4:
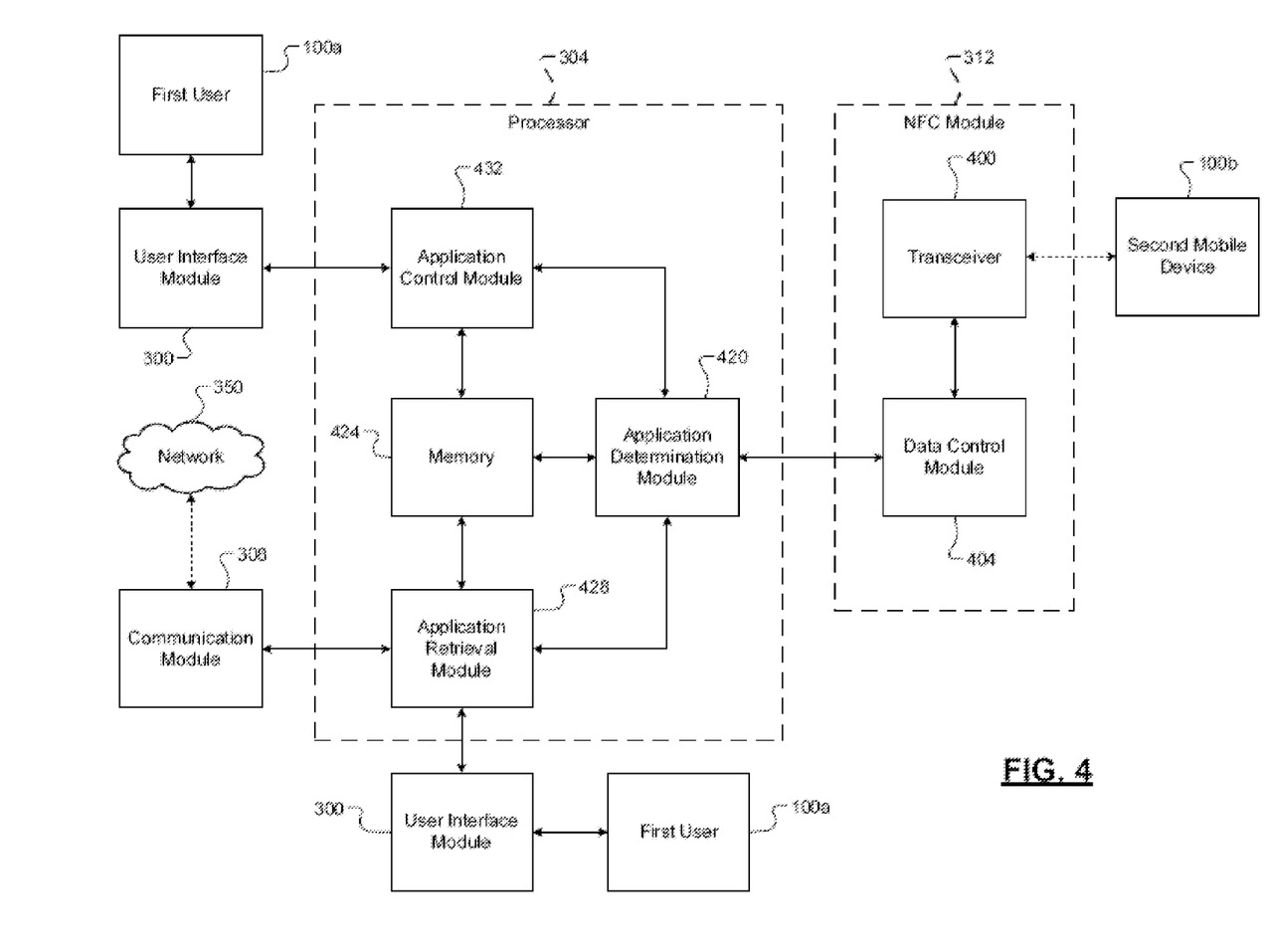
FIG. 4 is a functional block diagram of a processor and an NFC module of the mobile device of FIG. 3.

Referring now to FIG. 4, examples of the processor 304 and the NFC module 312 are shown in more detail. The NFC module 312 may include a transceiver 400 and a data control module 404. While these two components are shown and described herein, the NFC module 312 may include other suitable computing components, such as memory.

The transceiver 400 transmits information to and receives information from the second mobile device 100b via NFC. The data control module 404 receives data received by the transceiver 400 via an NFC transmission from the second mobile device 100b. Specifically, the data control module 404 receives first data and second data. The first data is based on input from the second user 108b to the second mobile device 100b. For example, the first data may be an audio file, a video file, a photo, or a document file. The second data is metadata indicating a software application associated with the first data. While receiving and processing of data is described herein, the data control module 404 may also control preparation of data for transmission by the transceiver 400 to the second mobile device 100b via NFC. For example, the data control module 404 may packetize the first data and the second data. Similarly, the data control module 404 may also control preparation of received data for processing by the processor 304. For example, the data control module 404 may unpack a received packet to obtain the first data and the second data (the metadata).

The processor 304 may include an application determination module 420, memory 424, an application retrieval module 428, and an application control module 432. The processor 304 may entirely or partially execute these modules. In addition, while these four components are shown and described herein, the processor 304 may include other suitable components such as cache memory.

The application determination module 420 receives the first data and the second data from the data control module 404. The application determination module 420 determines the software application specified by the second data. For example, the second data may include a unique identifier, e.g., a unique code, which corresponds to a particular software application. For example only, the unique identifiers may correspond to a third plurality of software applications which are associated with software applications for mobile devices in general. The third plurality of software applications may be greater than the second plurality of software applications, and the second plurality of software applications may be greater than the first plurality of software applications. The application determination module 420 may search the memory 424 to determine whether the first mobile device 100*a* has the software application. When the first mobile device 100*a* has the software application, the application determination module 420 may notify the application control module 432. When the first mobile device 100*a* does not have the software application, the application determination module 420 may notify the application retrieval module 428.

The application retrieval module 428 may retrieve the software application when notified by the application determination module, e.g., when the first mobile device 100*a* does not have the software application indicated by the second data. The application retrieval module 428 may retrieve the software application via the communication module 308 and the network 350. For example, the application retrieval module 428 may download the software application, e.g., from the Internet. The application retrieval module 428, however, may also retrieve or download the software application from other sources or via other communication mediums. The application retrieval module 428 may then store the software application in the memory 424.

The application retrieval module 428 may also request input from the first user 108*a* to allow the first mobile device 100*a* to retrieve, e.g., download, the software application. The application retrieval module 428, therefore, may also generate a request to allow the first mobile device 100*a* to retrieve the software application via the network 350. The request may be provided to the first user 108*a* via the user interface module 300 (and the first touch display 104*a*). The first user 108*a* may then provide input, the input including a response to the request, the response indicating whether the first mobile device 100*a* can download the software application. The application retrieval module 428, therefore, may then selectively retrieve the software application (and store the software application in the memory 424) based on the input from the first user 108*a*.

The application control module 432 controls software applications and coordinates with the user interface module 300 in order to present the first data to the first user 108*a*, e.g., via the first touch display 104*a*. The application control module 432 may proceed with opening the first data when the first mobile device 100*a* already has the software application indicated by the second data, e.g., in memory 424. Alternatively, the application control module 432 may wait for the application retrieval module 428 to download the software application from the network 350. The application control module 432 may then open the first data using the retrieved software application, e.g., now stored in memory 424. For example, opening the first data may include providing the first data to the first user 108*a* via the first touch display 104*a* using the software application.

Figure 5:
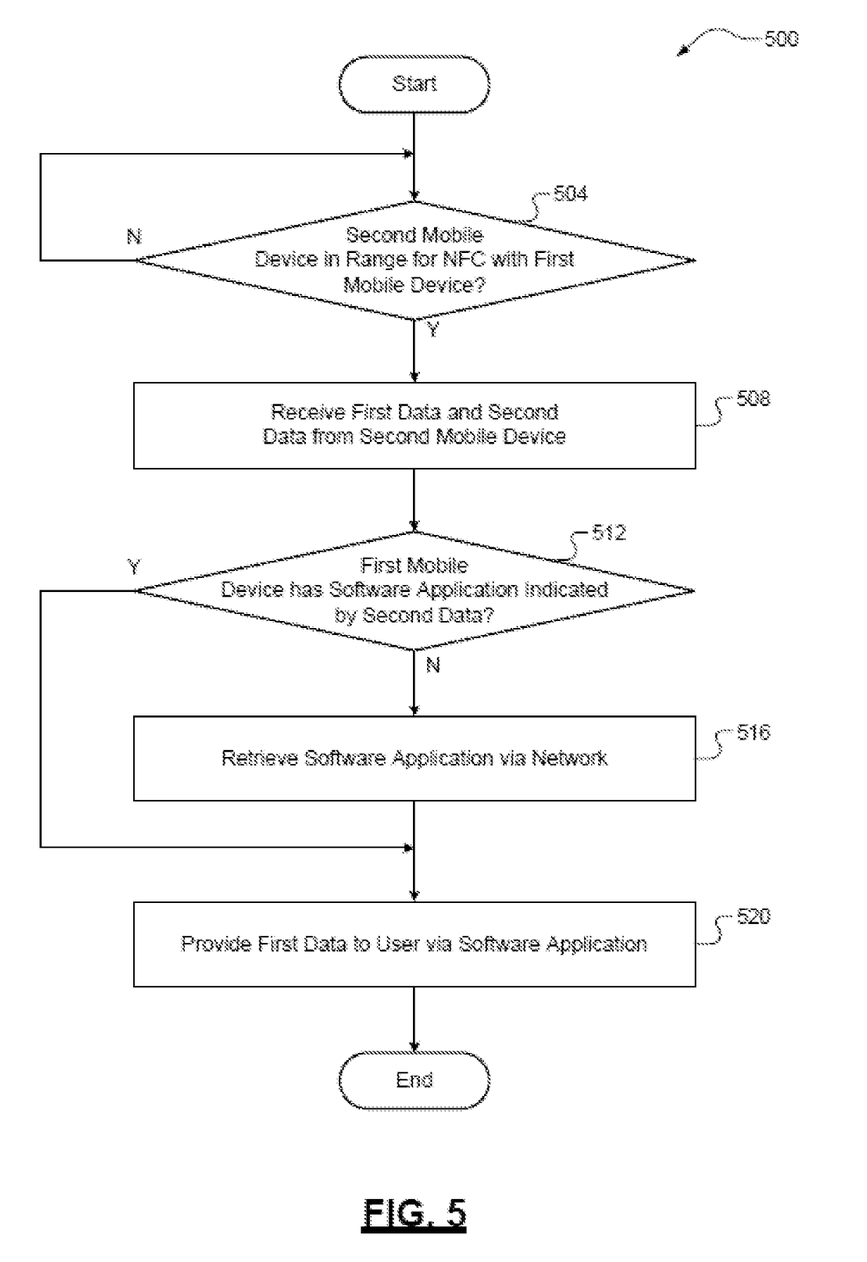
FIG. 5 is a flow diagram of a technique for using software application-related metadata in NFC transmissions according to some implementations of the present disclosure.

Referring now to FIG. 5, an example of a technique 500 for using application-related metadata in NFC transmissions is illustrated. At 504, the NFC module 312 determines whether the second mobile device 100*b* is within range for NFC with the first mobile device 100*a*. If true, control may proceed to 508. If false, control may return to 504. At 508, the NFC module 312 receives first data and second data from the second mobile device 100*b* via an NFC transmission, the first data based on input from the second user 108*b* associated with the second mobile device 100*b*, the second data being metadata indicating a software application associated with the first data.

At 512, the application determination module 420 determines whether the first mobile device 100*a* has the software application indicated by the second data. For example, the application determination module 420 may search the memory 424. If true, control may proceed to 520. If false, control may proceed to 516. At 516, the application retrieval module 428 may retrieve the software application via the network 350, e.g., the Internet, (via the communication module 308). For example, the application retrieval module 428 may download the software application and store the software application in the memory 424. At 520, the application control module 432 may provide the first data to the first user 108*a* using the software application, e.g., in conjunction with the user interface module 300. The technique 500 may then end or return to 504 for one or more additional cycles.

Figure 6:
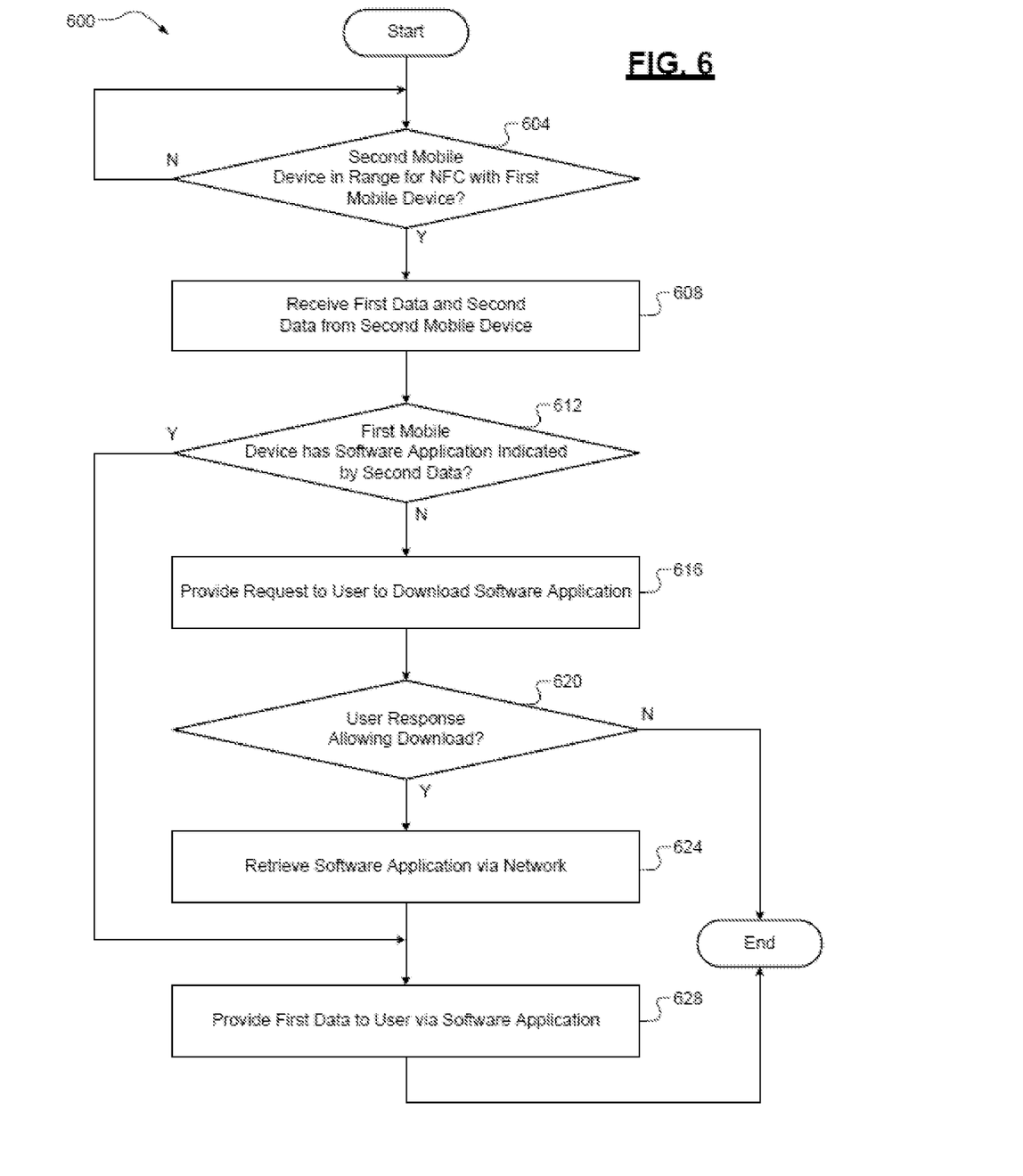
FIG. 6 is a flow diagram of another technique for using software application-related metadata in NFC transmissions according to some implementations of the present disclosure.

Referring now to FIG. 6, an example of a technique 600 for using application-related metadata in NFC transmissions is illustrated. At 604, the NFC module 312 determines whether the second mobile device 100*b* is within range for NFC, the range for NFC being based on whether second mobile device 100*b* is within a predetermined distance 212 from the first mobile device 100*a*, the predetermined distance 212 corresponding to a maximum distance for acceptable NFC transmissions. If true, control may proceed to 608. If false, control may return to 604.

At 608, the NFC module 312 may receive first data and second data from the second mobile device 100*b* via an NFC transmission, the first data being based on input from the second user 108*b* associated with the second mobile device 100*b*, the second data being metadata indicating a software application associated with the first data. At 612, the application determination module 420 determines whether the first mobile device 100*a* has the software application indicated by the second data, the software application being configured to provide the first data to the first user 108*a*. For example, the application determination module 420 may search the memory 424 for the software application. If true, control may proceed to 628. If false, control may proceed to 616. At 616, the application retrieval module 428 may generate a request for the first user 108*a* to allow the first mobile device 100*a* to download the software application.

At 620, the application retrieval module 428 may determine whether the first user 108*a* granted permission to the first mobile device 100*a* to download of the software application. For example, the first user 108*a* may have provided input including a response to the request after being prompted. If true, control may proceed to 624. If false, control may end or return to 604 for one or more additional cycles. At 624, the application retrieval module 428 may retrieve, e.g., download, the software application from the network 350 (via the communication module 308). For example, the application retrieval module 428 may then store the software application in the memory 424. At 628, the application control module 432 may then provide the first data to the first user 108*a* using the software application, e.g., in conjunction with the user interface module 300. The technique 600 may then end or return to 604 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for near field communication (NFC) between a first mobile device and a second mobile device, the method comprising: determining, at the first mobile device, whether the second mobile device is within range for NFC, the range for NFC being based on whether the second mobile device is within a predetermined distance from the first mobile device, the predetermined distance corresponding to a maximum distance for acceptable NFC transmissions, the first mobile device being associated with a first user; when the second mobile device is within range for NFC with the first mobile device, receiving, at the first mobile device, first data and second data from the second mobile device via an NFC transmission, the first data being based on input from a second user associated with the second mobile device, the second data being metadata indicating a software application configured to process the first data; determining, at the first mobile device, whether the first mobile device has the software application indicated by the second data, the software application being configured to provide the first data to the first user;
   when the first mobile device has the software application indicated by the second data, selecting, at the first mobile device, the software application indicated by the second data from a plurality of applications stored in a memory of the first mobile device, each of the plurality of applications also being configured to process the first data;
   when the first mobile device does not have the software application indicated by the second data, providing, via a display of the first mobile device, a request to the first user to allow the first mobile device to download the software application via a network;
   receiving, via a user interface of the first mobile device, input from the first user, the input including a response to the request, the response indicating whether the first mobile device can download the software application via the network; selectively retrieving, at the first mobile device, the software application from the network based on the input from the first user; and selectively providing, at the first mobile device, the first data to the first user via the software application.

2. A computer-implemented method, comprising:
   determining, at a first mobile device associated with a first user, whether a second mobile device is within range for near field communication (NFC) with the first mobile device;
   when the second mobile device is within range for NFC with the first mobile device, receiving, at the first mobile device, first data and second data from the second mobile device via an NFC transmission, the first data being based on input from a second user associated with the second mobile device, the second data being metadata indicating a software application associated with the first data, wherein the software application is configured to process the first data;
   determining, at the first mobile device, whether the first mobile device has the software application indicated by the second data;
   in response to determining that the first mobile device has the software application indicated by the second data, selecting, by the first mobile device, the software application indicated by the second data from a first plurality of applications stored in a memory of the first mobile device, each of the first plurality of applications being configured to process the first data;
   in response to (i) determining that the first mobile device does not have the software application indicated by the second data and (ii) receiving a response to a request, the response indicating that the first user has granted permission to the first mobile device:
      retrieving, by the first mobile device, the software application via a network; and
   providing, at the first mobile device, the first data to the first user via the software application.

3. The computer-implemented method of claim 2, wherein retrieving the software application via the network further includes providing, via a display of the first mobile device, the request to the first user, the request being to allow the first mobile device to download the software application via the network.

4. The computer-implemented method of claim 2, wherein the second mobile device generates a packet including both the first data and the second data.

5. The computer-implemented method of claim 4, wherein the second data includes a unique identifier indicating one of a second plurality of software applications associated with mobile devices.

6. The computer-implemented method of claim 5, wherein determining whether the first mobile device has the software application further includes searching a memory of the first mobile device.

7. The computer-implemented method of claim 6, wherein retrieving the software application via the network further includes downloading the software application via the network and storing the software application in the memory.

8. The computer-implemented method of claim 6, wherein the memory is configured to store a third plurality of software applications, wherein at least one of the third plurality of software applications is not associated with the first data.

9. The computer-implemented method of claim 8, wherein the first plurality of software applications is less than or equal to the second plurality of software applications.

10. The computer-implemented method of claim 2, wherein determining whether the second mobile device is in range for NFC with the first mobile device further includes generating, at the first mobile device, an electromagnetic field using radio frequency (RF) waves, and wherein determining whether the second mobile device is in range for NFC with the first mobile device is based on a response from the second mobile device to the electromagnetic field.

11. A system, comprising:
a near field communication (NFC) module that:
  determines, at a first mobile device associated with a first user, whether a second mobile device is within range for NFC with the first mobile device, and
  when the second mobile device is within range for NFC with the first mobile device, receives, at the first mobile device, first data and second data from the second mobile device via an NFC transmission, the first data being based on input from a second user associated with the second mobile device, the second data being metadata indicating a software application associated with the first data, wherein the software application is configured to process the first data;
an application determination module that (i) determines, at the first mobile device, whether the first mobile device has the software application indicated by the second data and, in response determining that the first mobile device has the software application, selects, at the first mobile device, the software application indicated by the second data from a first plurality of applications stored in a memory of the first mobile device, each of the first plurality of applications being configured to process the first data;
an application retrieval module that, in response to (i) determining that the first mobile device does not have the software application indicated by the second data and (ii) receiving a response to a request, the response indicating that the first user has granted permission to the first mobile device: retrieves, at the first mobile device, the software application via a network; and
an application control module that provides, at the first mobile device, the first data to the first user via the software application.

12. The system of claim 11, wherein the application retrieval module provides, via a display of the first mobile device, the request to the first user, the request being to allow the first mobile device to download the software application via the network.

13. The system of claim 11, wherein the second mobile device generates a packet including both the first data and the second data.

14. The system of claim 13, wherein the second data includes a unique identifier indicating one of a second plurality of software applications associated with mobile devices.

15. The system of claim 14, the application determination module determines whether the first mobile device has the software application by searching a memory of the first mobile device.

16. The system of claim 15, wherein the application retrieval module retrieves the software application via the network by downloading the software application via the network and storing the software application in the memory.

17. The system of claim 15, wherein the memory is configured to store a third plurality of software applications, wherein at least one of the third plurality of software applications is not associated with the first data.

18. The system of claim 17, wherein the first plurality of software applications is less than or equal to the second plurality of software applications.

19. The system of claim 11, wherein the NFC module determines whether the second mobile device is in range for NFC with the first mobile device by generating an electromagnetic field using radio frequency (RF) waves, and wherein the NFC module determines whether the second mobile device is in range for NFC with the first mobile device based on a response from the second mobile device to the electromagnetic field.

20. A computer-implemented method comprising:
receiving, by a first device and using a near field communication (NFC) connection established between the first device and a second device, (i) a digital item, and (ii) an indication of a first application capable of processing the digital item at the first device;
determining, by the first device, whether the first device has the first application;
in response to (i) determining that the first device has the first application and (ii) when the first device has a first plurality of applications capable of processing the digital item:
  selecting the first application or a second application specified by the indication from the first plurality of applications stored in a memory of the first device;
in response to (i) determining that the first device does not have the first application and (ii) a response to a request, the response indicating that a user of the first device has granted approval to the first device:
  obtaining, by the first device via a network, the first application or a second application that is capable of processing the digital item at the first device; and
processing, by the first device, the digital item using the first application or the second application.

21. The computer-implemented method of claim 20, wherein obtaining, by the first device, the first application or the second application is performed automatically upon receiving, by the first device, the digital item and the indication of the first application capable of processing the digital item at the first device.

22. The computer-implemented method of claim 20, wherein obtaining, by the first device, the first application or the second application via a higher-bandwidth, non-NFC connection.

23. The computer-implemented method of claim 20, wherein the indication includes a unique identifier or a unique code indicating one of a second plurality of software applications associated with mobile devices, the second plurality of applications being greater than or equal to the first plurality of applications.

* * * * *